(12) United States Patent
Kafka et al.

(10) Patent No.: US 8,886,234 B2
(45) Date of Patent: Nov. 11, 2014

(54) TECHNIQUES FOR UNIFIED MESSAGING

(75) Inventors: Steven D. Kafka, Mountain View, CA (US); Jason F. Moore, Redmond, WA (US); Gandhimathi Vaithilingam, Sunnyvale, CA (US); Aby John, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 242 days.

(21) Appl. No.: 13/080,911

(22) Filed: Apr. 6, 2011

(65) Prior Publication Data

US 2012/0258742 A1 Oct. 11, 2012

(51) Int. Cl.
*H04W 4/00* (2009.01)
*H04W 4/12* (2009.01)

(52) U.S. Cl.
CPC ............... *H04W 4/12* (2013.01); *H04W 4/003* (2013.01)
USPC ............................ 455/466; 709/206; 709/217

(58) Field of Classification Search
CPC .......... H04W 4/12; H04W 4/14; H04W 88/18
USPC .................................. 455/466; 709/206, 217
See application file for complete search history.

(56) References Cited

U.S. PATENT DOCUMENTS

| 7,315,613 | B2 | 1/2008 | Kleindienst et al. |
| 7,801,968 | B2 | 9/2010 | Wang et al. |
| 8,295,864 | B2 * | 10/2012 | Samaha ........................ 455/466 |
| 8,331,962 | B2 * | 12/2012 | Chang ........................... 455/466 |
| 8,452,314 | B2 * | 5/2013 | Kristiansson et al. ........ 455/466 |
| 2005/0105697 | A1 | 5/2005 | Hollowell et al. |
| 2008/0008163 | A1 | 1/2008 | Castell et al. |
| 2008/0037583 | A1 | 2/2008 | Dawes et al. |
| 2009/0006548 | A1 | 1/2009 | Ramanathan et al. |
| 2009/0216840 | A1 * | 8/2009 | Pajunen et al. ............... 709/206 |
| 2010/0115035 | A1 | 5/2010 | Malhar et al. |
| 2012/0131120 | A1 * | 5/2012 | Maghraby .................... 709/206 |
| 2012/0226759 | A1 * | 9/2012 | Lew et al. .................... 709/206 |

OTHER PUBLICATIONS

"New Unified Messaging Functionality and Voice Mail Features in Exchange 2010 SP1", Retrieved at << http://msdn.microsoft.com/en-us/library/ff625231.aspx >>, 2010, pp. 7.

Harber, Hugo., "Communications Overload", Retrieved at << http://www.it-director.com/business/quality/content.php?cid=12511 >>, Jan. 18, 2011, pp. 3.

* cited by examiner

*Primary Examiner* — Amancio Gonzalez
(74) *Attorney, Agent, or Firm* — Tom Wong; Jim Ross; Micky Minhas

(57) ABSTRACT

Techniques involving unified messaging and other functionality are described. In one or more implementations, the techniques describe receiving a message at a web service from a messaging client and identifying a communication device that includes telephone functionality and is configured to format the message as a short messaging service (SMS) message. The SMS message may be identified by a phone number associated with the communication device. The message may then be sent to the communication device for automatic transmission of the SMS message by the communication device over a phone network.

20 Claims, 7 Drawing Sheets

TECHNIQUES FOR UNIFIED MESSAGING

BACKGROUND

The amount of functionality that is available from computing devices is ever increasing, such as from mobile devices, game consoles, televisions, set-top boxes, personal computers, and so on. Many of these computing devices are capable of communicating one with another. Electronic communication may be available in many different formats. One example of a popular communication format is referred to as a text message, which may be sent and/or received via a mobile phone.

Other devices may also send and/or receive text messages. However, many of these other devices may have limited text functionality which may negatively affect a text message being sent through one of these other devices. Consequently, users may become frustrated with the effects caused by the limited functionality of these other devices.

SUMMARY

Techniques involving unified messaging and other functionality are described. In one or more implementations, the techniques describe receiving a message at a web service from a messaging client and identifying a communication device that includes telephone functionality and is configured to format the message as a short messaging service (SMS) message. The SMS message may be identified by a phone number associated with the communication device. The message may then be sent to the communication device for automatic transmission of the SMS message by the communication device over a phone network.

In implementations, techniques involving unified messaging involve receiving a message over a network at a communication device and configuring the message as a short messaging service (SMS) message. A phone number associated with the communication device may be assigned to the SMS message. Following this, the SMS message may be transmitted over a phone network.

In implementations, a SMS message may be received at a web service from a communication device, where the communication device is configured to forward the SMS message to the web service automatically and without user intervention. The web service may then synchronize the SMS message with multiple messaging clients associated with a user to enable the user to access the SMS message via one or more of the multiple messaging clients.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
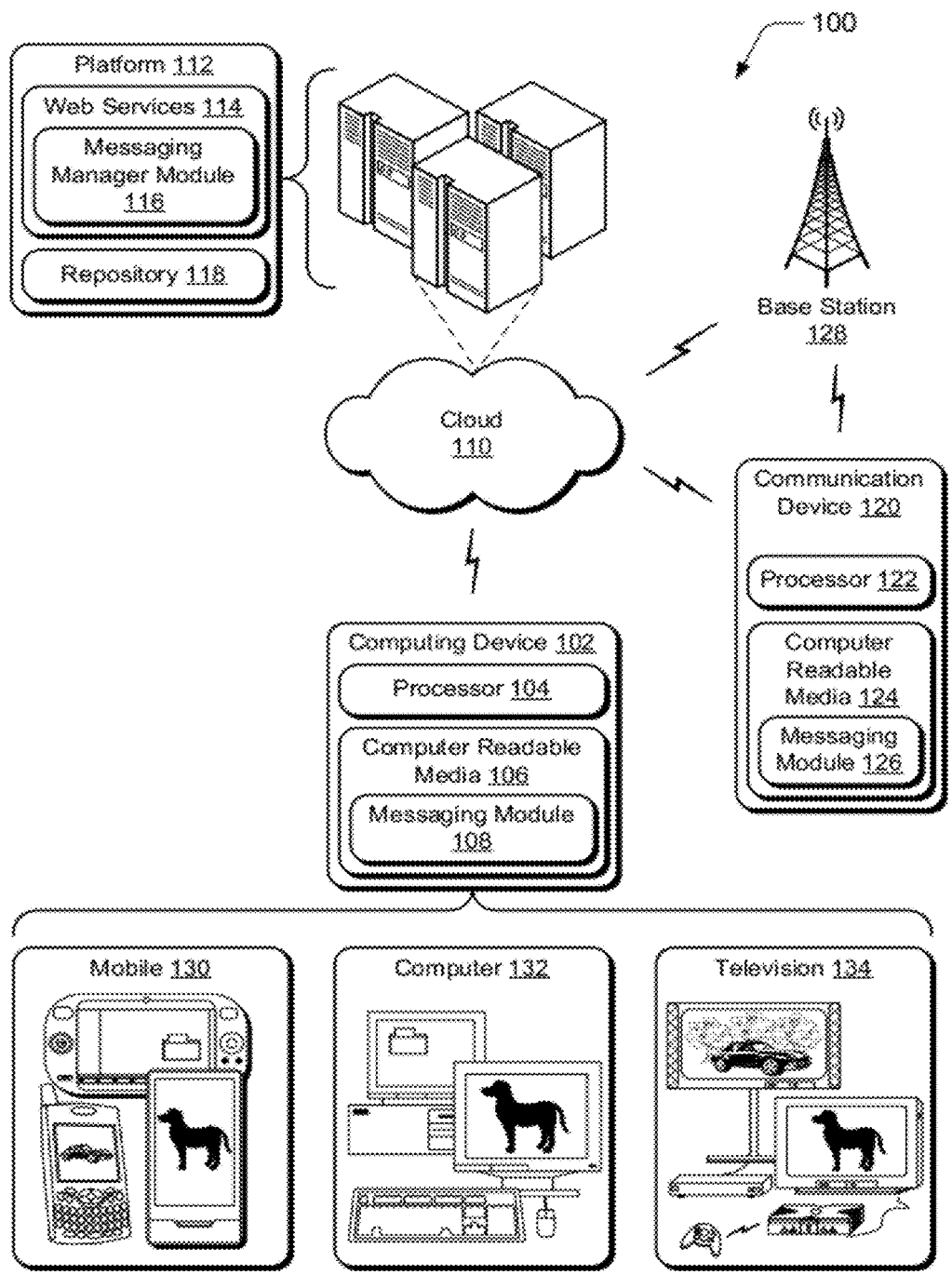
FIG. 1 is an illustration of an environment in an example implementation that is operable to employ unified messaging techniques.

Conventional techniques that were used to send and/or receive text messages operated via mobile phones. Other devices and applications, however, were subsequently developed to also avail themselves of text functionality. The text functionality on these other devices, however, may be limited so as to negatively affect a text message being sent from one of these other devices. For example, a recipient of the text message may receive the text message with missing or altered information such that it is difficult to identify a sender of the text. For example, a random phone number may be attached to the text message and thus the message is typically not resolved by the user's contact information to identify the sender.

Techniques involving unified messaging are described. In the following discussion, a variety of different implementations are described that involve unified messaging to send and/or receive electronic messages over a variety of devices. In this way, a user may readily access the messaging functionality in an efficient manner without encountering the complexities involved using conventional messaging techniques.

For example, in one or more implementations, unified messaging involves receiving a message at a web service from a messaging client (e.g., that is not an SMS message) and identifying a communication device that includes telephone functionality and is configured to format the message as a short messaging service (SMS) message. The SMS message may thus be identified by a phone number associated with the communication device. Accordingly, a recipient of the SMS message may readily identify the sender of the SMS message. The message may then be sent to the communication device for automatic transmission of the SMS message over a telephone network. Further discussion of this and other implementations that involve unified messaging may be found in the following sections.

In another example, a SMS message may be received at a web service from a communication device, where the communication device is configured to forward the SMS message to the web service automatically and without user intervention. Once received, the web service may synchronize the SMS message with multiple messaging clients associated with a user to enable the user to access the SMS message via one or more of the multiple messaging clients. In this way, a unified user experience may be supported across a variety of different devices.

In the following discussion, an example environment is first described that is operable to employ the unified messaging techniques described herein. Example illustrations of systems and procedures involving unified messaging are then described, which may be employed in the example environment as well as in other environments. Accordingly, the example environment is not limited to performing the example systems and procedures. Likewise, the example procedures and systems are not limited to implementation in the example environment.

Example Environment

FIG. 1 is an illustration of an environment 100 in an example implementation that is operable to employ techniques for unified messaging. The illustrated environment 100 includes an example of a computing device 102 that includes a processor 104 and computer readable media 106, which may include a messaging module 108. The illustrated environment 100 also includes a cloud 110, such as a network or the Internet, and one or more platforms 112 for web services 114, and the like. The web services 114 may include a messaging manager module 116 and may be communicatively coupled to a repository 118.

The illustrated environment 100 also includes an example communication device 120 that includes a processor 122, computer readable media 124 (e.g., memory), and a messaging module 126. The communication device 120 may be configured with functionality operable to communicate with other devices over a network provided by a base station 128. The base station 128 may provide a communication network apart from and/or in conjunction with the cloud 110. For example, the base station may establish a cellular network or other phone network, a radio network, and so on.

The illustrated environment 100 includes an example computing device 102 that may be configured in a variety of ways. For example, the computing device 102 may be configured as a traditional computer (e.g., a desktop personal computer, laptop computer, and so on), a mobile station, an entertainment appliance, tablet, a set-top box communicatively coupled to a television, a wireless phone, a netbook, a game console, and so forth. Thus, the computing device 102 may range from full resource devices with substantial memory and processor resources (e.g., personal computers, game consoles) to a low-resource device with limited memory and/or processing resources (e.g., traditional set-top boxes, handheld game consoles). The computing device 102 may also relate to software that causes the computing device 102 to perform one or more operations. Thus, the techniques described herein may be supported by these various configurations of the computing device 102 and are not limited to the specific examples described in the following sections.

The messaging module 108 is representative of functionality associated with communicating with one or more other devices over. The communication may be performed in a variety of ways. For example, the messaging module 108 may be configured to transmit and/or receive one or more messages to/from the web service 114, the communication device 120, or one or more other devices over the cloud 110.

The example system 100 illustrated in FIG. 1 shows the messaging module 108 as being implemented in an environment where multiple devices are interconnected through a central computing device. The central computing device may be local to the multiple devices or may be located remotely from the multiple devices. In the illustrated embodiment, the central computing device is implemented as part of a "cloud" server farm, which comprises one or more server computers that are connected to the multiple devices through a network, e.g., the Internet. This interconnection architecture may be leveraged to deliver this functionality across multiple devices, such as to provide a common and seamless experience to the user of the multiple devices. Each of the multiple devices may have different physical attributes and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices.

For example, as previously described the computing device 102 may assume a variety of different configurations, such as for mobile 130, computer 132, and television 134 uses. Each of these configurations has a generally corresponding screen size and thus the computing device 102 may be configured accordingly to one or more of these device classes in this example system 100. For instance, the computing device 102 may assume the mobile 130 class of device which includes mobile phones, portable music players, game devices, and so on. The mobile 130 class of device may also include other handheld devices such as personal digital assistants (PDA), mobile computers, digital cameras, and so on. The computing device 102 may also assume a computer 132 class of device that includes personal computers, laptop computers, tablet computers, netbooks, and so on. The television 134 configuration includes configurations of devices that involve display on a generally larger screen in a casual environment, e.g., televisions, set-top boxes, game consoles, and so on. Thus, the techniques described herein may be supported by these various configurations of the computing device 102 and are not limited to the specific examples described in the following sections.

The cloud 110 is illustrated as including a platform 112 for web services 114. The platform 112 abstracts underlying functionality of hardware (e.g., servers) and software resources of the cloud 110 and thus may act as a "cloud operating system." For example, the platform 112 may abstract resources to connect the computing device 102 with other computing devices. The platform 112 may also serve to abstract scaling of resources to provide a corresponding level of scale to encountered demand for the web services 114 that are implemented via the platform 112. A variety of other examples are also contemplated, such as load balancing of servers in a server farm, protection against malicious parties (e.g., spam, viruses, and other malware), and so on. Thus, web services 114 and other functionality may be supported without the functionality "having to know" the particulars of the supporting hardware, software, and network resources.

Accordingly, in an interconnected device embodiment, implementation of functionality of the messaging module 108 may be distributed throughout the system 100. For example, the messaging module 108 may be implemented in part on the computing device 102 as well as via the platform 112 that abstracts the functionality of the cloud 110.

The messaging manager module 116 is representative of functionality associated with managing a variety of messages transmitted to or from various computing devices 102. For example, the messaging manager module 116 may manage storage of one or more messages in a repository 118 or other database. Further, the messaging manager module 116 may identify a communication device 120 associated with the same user that sent the message from the computing device 102, and cause the communication device 120 to format the message as a SMS message and transmit the SMS message over the network provided by the base station 128.

In addition, messages sent to the computing device 102 over the cloud 110 may be routed through the platform 112, and the messaging manager module 116 may synchronize the message with multiple computing devices 102 that are each associated with a same recipient user. These synchronized messages may then be accessed by the recipient user at any of the multiple computing devices 102, further discussion of which may be found in relation to FIGS. 2 and 3.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents instructions (e.g., program code) that perform specified tasks when executed on a processor (e.g., CPU or CPUs), functional blocks, and so on. The instructions can be stored in one or more computer readable memory devices.

The instructions can be stored in one or more computer readable media. One such configuration of a computer-readable medium is signal bearing medium and thus is configured to transmit the instructions (e.g., as a carrier wave) to the hardware of the computing device, such as via the network 104. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data. The features of the techniques described below are platform-independent, meaning that the techniques may be implemented on a variety of commercial computing platforms having a variety of hardware configurations.

Figure 2:
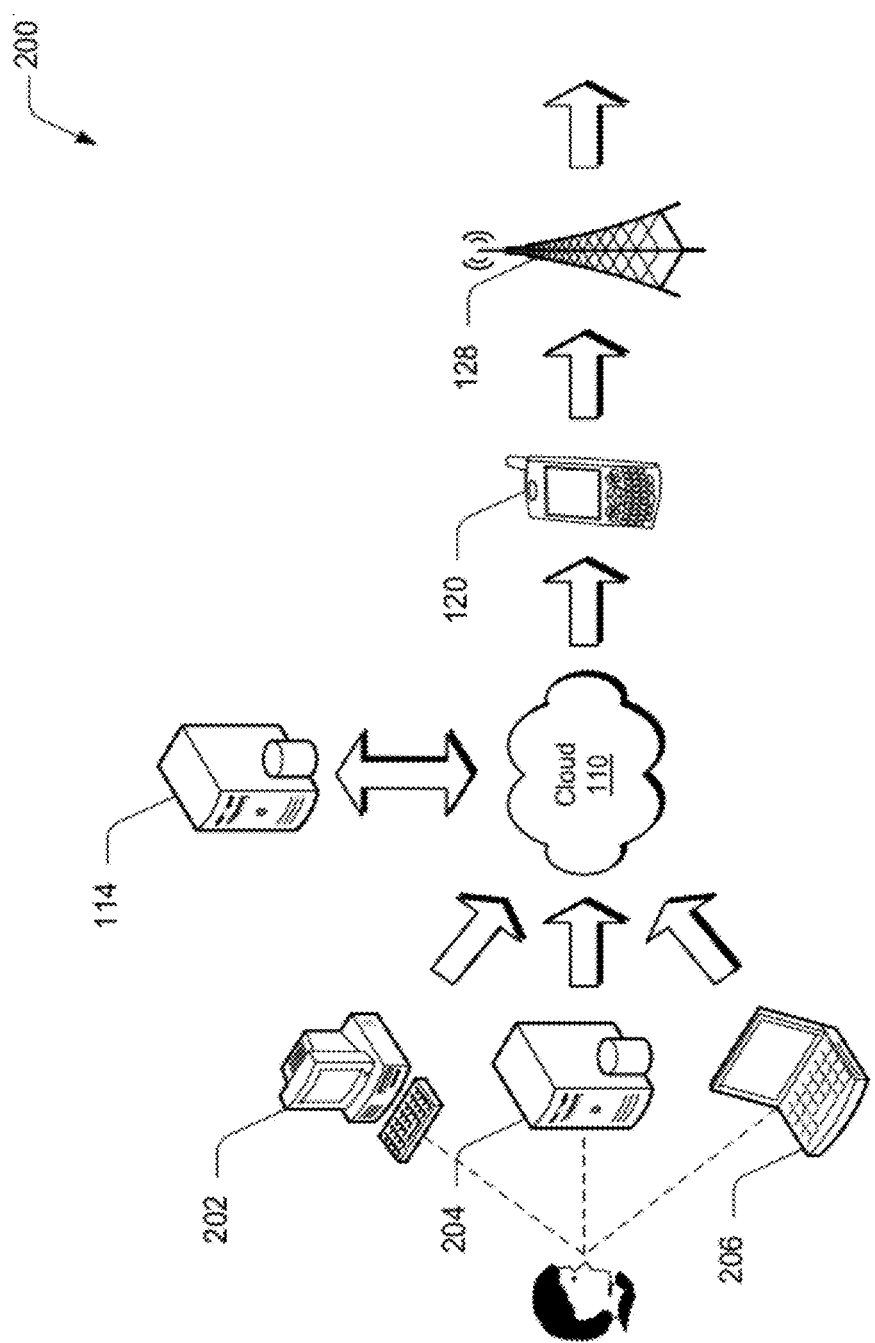
FIG. 2 illustrates an environment in an example implementation that is operable to employ unified messaging techniques for outgoing messages.

FIG. 2 is an illustration of an example implementation 200 that is operable to employ unified messaging techniques for outgoing messages. A user may compose a SMS message at a variety of messaging clients that may be implemented by a variety of different configurations of the computing device 102 as described in relation to FIG. 1. For example, the user may compose a SMS message via an email client 202, a web client 204, an instant messaging client 206, or any other messaging client other than a phone. For instance, a message sent via the email client 202 may identify the sender by the sender's email address, which may include a user name and domain name. If the user sends a message via the web client 204, the user may be identified by his or her email address or Internet Protocol (IP) address. If, however, the user sends a message via the IM client 206, the user may be identified by a username, an email address, and so on.

These messaging clients may also direct messages to a phone number, which may be associated with a mobile phone capable of receiving messages such as SMS messages. However, using traditional techniques, messages sent from these types of clients may not be associated with the sender's phone number. Thus, the recipient of the SMS message may read the message, but certain sender information helpful in identifying who sent the message may not be included in the message or may be altered in some way. For instance, traditional techniques for sending a SMS message via an email client may attach a random phone number to the SMS message when transmitting the SMS message to the recipient mobile phone. Therefore, it may become difficult for the recipient to identify the sender of the SMS message, e.g., because the phone number is not capable of being resolved using contact information of the recipient.

The message composed at one of the messaging clients may be transmitted over the cloud 110 to a web service 114. The web service 114 may then identify a communication device 120 that includes telephone functionality and is associated with the sender of the message. For example, the web service 114 may search the repository 118 for a phone number associated with the user identified by the sender information attached to the message, identify a particular computing device capable of sending the message in a desired format (e.g., SMS), and so on. The web service 114 may then forward the message to the communication device 120.

The communication device 120 may, automatically and without user intervention, format the message as a SMS message, attach the user's phone number to the SMS message, and send the formatted SMS message over a phone network provided by the base station 128 to the intended recipient. By attaching the user's phone number to the SMS message, the recipient may readily identify the sender of the message. The communication device 120 may also generate and/or display a notification or confirmation that the SMS message was transmitted. Additionally, the communication device 120 may include the transmitted SMS message in a history of sent messages, even though the message was composed at a different messaging client.

In this way, no matter which messaging client is used to compose the SMS message, the sender's identification may remain the same to the recipient through communication through the communication device 120. For example, the sender may send one SMS message via the email client 202 and then send another SMS message via the IM client 206 to the same recipient. The recipient, in this example, may see the same sender information on both of the SMS messages. For example, the recipient may see the sender's phone number attached to each of the SMS messages, even though each SMS message was composed at a different messaging client.

Figure 3:
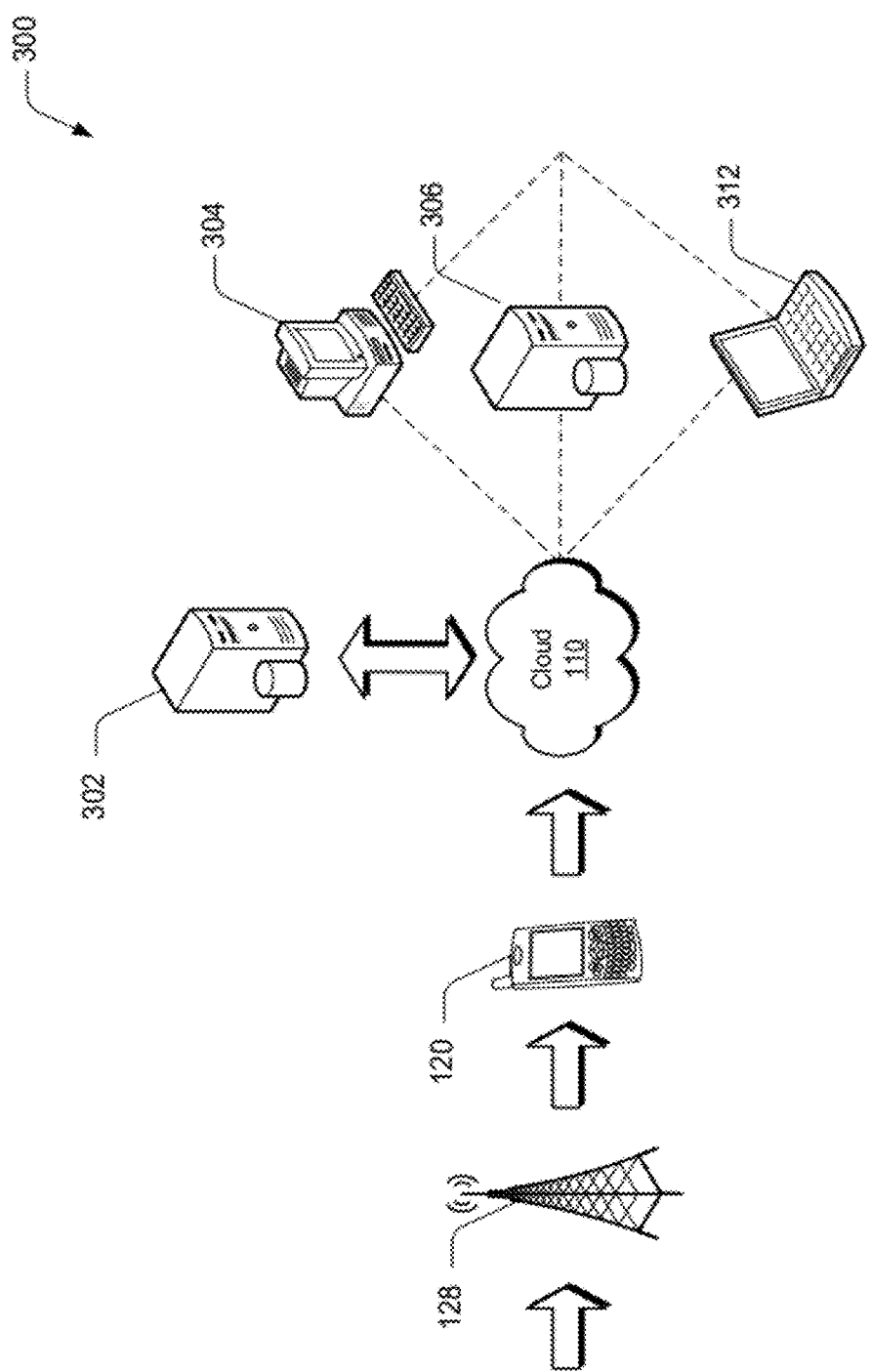
FIG. 3 illustrates an example environment in an example implementation that is operable to employ unified messaging techniques for incoming messages.

Consider now FIG. 3, which is an example implementation 300 in which a SMS message is received at a variety of messaging clients via unified messaging techniques. An incoming SMS message is received through the base station's 128 phone network at a recipient's communication device 120. Automatically and without user intervention, the communication device 120 may forward a copy of the SMS message to a web service 302 over the cloud 110. This may be accomplished using the messaging module 126 on the communication device 120.

The web service 302 may then synchronize the SMS message with a plurality of other devices associated with the recipient. For example, the web service 302 may synchronize the SMS message with the recipient's email client 304, the recipient's web client 306, the recipient's IM client 308, and/or any other messaging client associated with the recipient user. In implementations, the web service 302 may use the phone number of the recipient's communication device 120 to identify other contact information associated with the recipient. For example, the web service 302 may search the repository 118 to locate addresses associated with one or more messaging clients used by the recipient. In implementations, the web service 302 may identify a particular email address associated with the recipient, and synchronize the SMS message with the email client 304 for that particular email address.

Additionally, the web service 302 may access and search the recipient's address book associated with the email address to locate personalized contact information associated with the sender. For example, although the incoming SMS message may include the sender's phone number, the web service 302 may use the sender's phone number to locate other contact information, such as a name or email address, associated with the sender.

After locating this other contact information in the recipient's address book, the web service 302 may modify the sender's information in the SMS message to enable the recipient to readily identify the sender. For example, assume Jill sends a SMS message to Jack's phone. Jack's phone may receive and then forward the SMS message to the web service, which in turn synchronizes the SMS message with Jack's email account and modifies the sender information according to Jack's contact information, e.g., an address book. Jack may then access the SMS message via his email client and may readily see that the incoming message is sent from "Jill" rather than from "555-5455".

In addition, the web service 302 may store the SMS message in a database to allow the recipient to access the SMS message at a later time. In this way, the recipient may access the SMS message from one or more of a variety of different messaging clients. For example, if the recipient is at work and receives a SMS message at his mobile phone, the recipient may access the SMS message via his email client on a desktop computer, rather than checking his mobile phone. This may be beneficial if the recipient inadvertently left his mobile phone in another location, e.g., at home or in the car, or if the recipient's mobile phone's battery becomes depleted. A variety of other scenarios are also contemplated, further discussion of which may be found in relation to the following example procedures.

Example Procedures

The following discussion describes techniques for unified messaging that may be implemented utilizing the previously described systems and devices. Aspects of the procedure may be implemented in hardware, firmware, software, or a combination thereof The procedure is shown as a set of blocks in this example that specify operations performed by one or more devices and are not necessarily limited to the orders shown for performing the operations by the respective blocks. In portions of the following discussion, reference will be made to the environment 100 of FIG. 1, the implementation 200 of FIG. 2, and the implementation 300 of FIG. 3.

Figure 4:
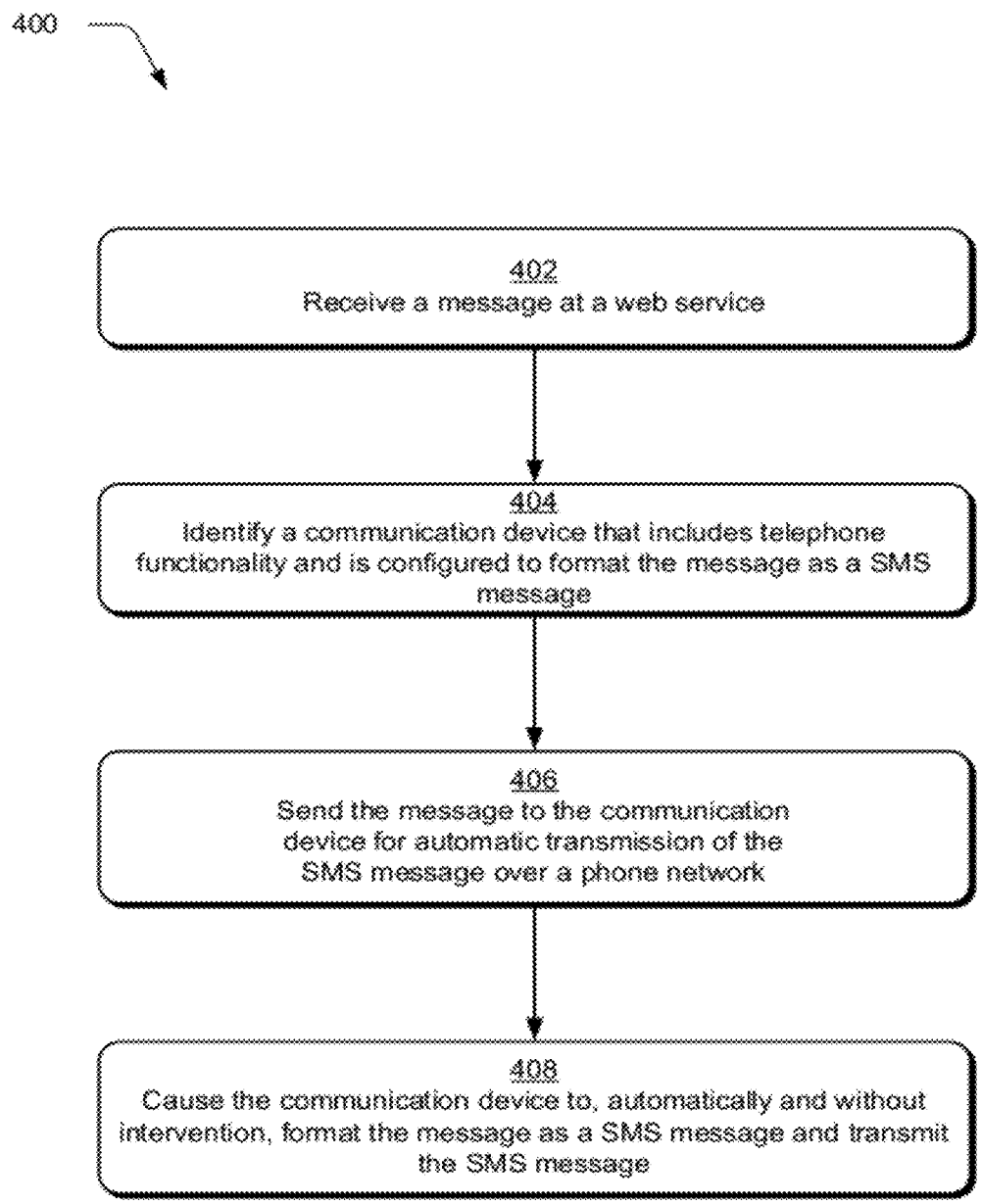
FIG. 4 is a flow diagram depicting a procedure in an example implementation of unified messaging techniques for outgoing messages in accordance with one or more embodiments.

FIG. 4 depicts a procedure 400 in an example implementation of unified messaging techniques in accordance with one or more embodiments. In at least some embodiments, procedure 400 may be performed by a suitably configured computing device either automatically or in response to a user command.

A message is received at a web service from a messaging client (block 402). For example, the message may include a text message composed via an email client or IM client. The message may be directed to a recipient's phone number and routed through the web service 114.

A communication device is identified that is configured to format the message as an SMS message (block 404). For example, the repository 118 may be searched to locate a communication device 120 that includes telephone functionality and is associated with a same user that sent the message via the messaging client.

The message is then sent to the communication device for automatic transmission of the SMS message over a phone network (block 406). For example, the message may be transmitted over the cloud 110 to the communication device 120. If the communication device 120, however, is powered off, the web service 114 may attempt to send the message again at a later time. For example, the web service 114 may make repeated attempts to transmit the message to the communication device 120 until the message is successfully transmitted. Alternatively, the web service 114 may implement a forward and forget methodology in which transmission of the message is attempted once.

The communication device is caused to, automatically and without intervention, format the message as a SMS message and transmit the SMS message over the phone network (block 408). For example, the messaging manager module 116 may represent functionality to instruct the communication device 120, upon receipt of the message, to format the message as a SMS message and transmit the SMS message over the base station's 128 telephone network without intervening A notification may also be provided to the user that the SMS message was sent, or not sent.

Figure 5:
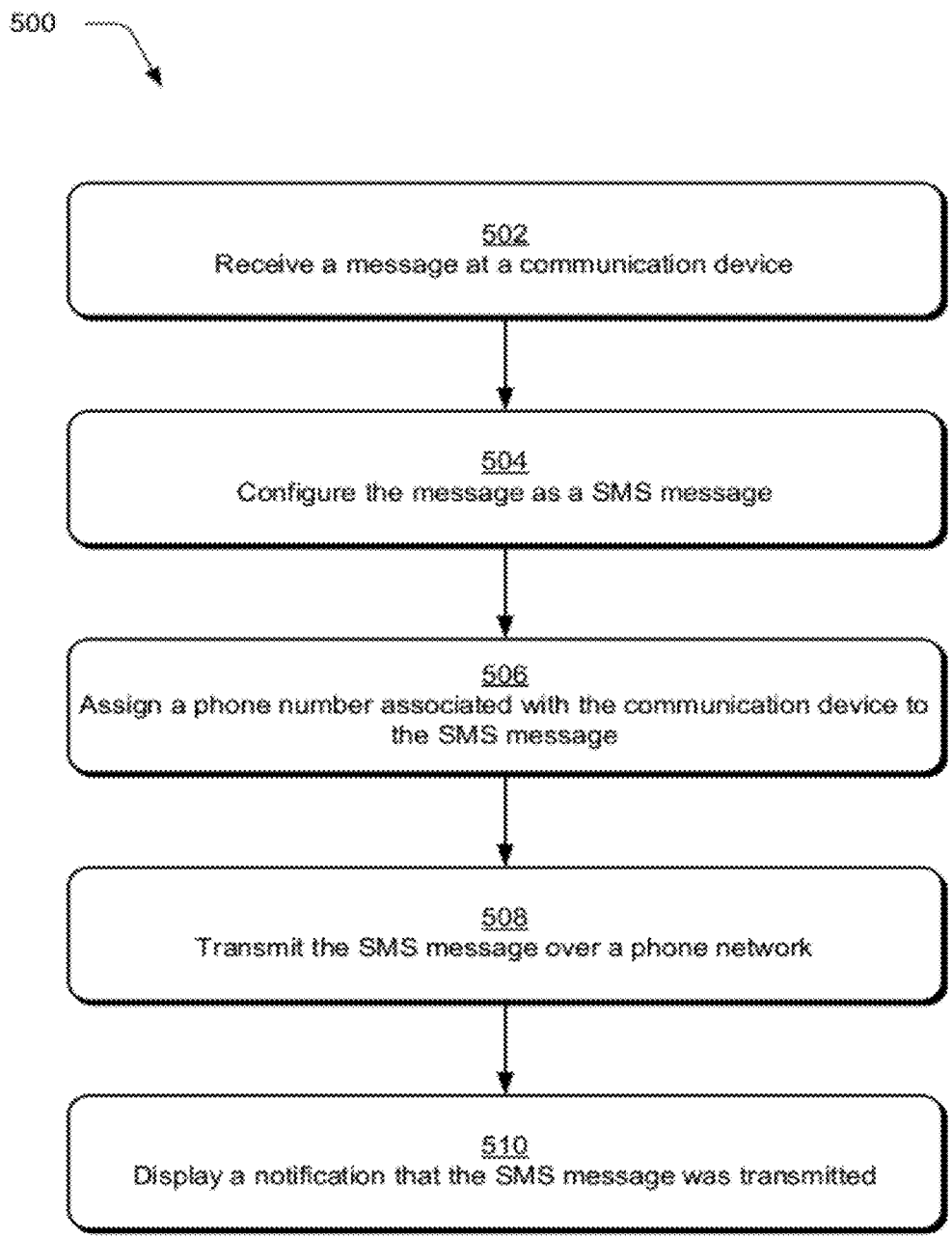
FIG. 5 is a flow diagram depicting a procedure in an example implementation of unified messaging techniques for outgoing messages in accordance with one or more embodiments.

FIG. 5 depicts a procedure 500 in an example implementation of unified messaging techniques in accordance with one or more embodiments. In at least some embodiments, procedure 500 may be performed by a suitably configured computing device such as computing device 102 either automatically or in response to a user command.

A message is received at a communication device (block 502). For example, the communication device 120 may receive the message over a network, such as the Internet, from the web service 114 that is not configured as a SMS message. The message may have been sent by a messaging client associated with a same user as the user associated with the communication device 120. The message, however, may have been routed through the web service 114 and may be configured to be routed through the communication device 120.

The message is configured as a short messaging service (SMS) message (block 504). For example, the message may have been generated at a messaging client with limited SMS messaging functionality. The communication device 120 may then augment that limited SMS messaging functionality by reformatting the message as a SMS message.

A phone number associated with the communication device is assigned to the SMS message (block 506). In implementations, the message may lack an associated phone number to identify the user that sent the message since the message may have been generated at a messaging client other than a phone. Thus, to enable a recipient of the SMS message to identify the sender of the message, the communication device 120 may assign a phone number associated with the communication device 120 to the SMS message.

The SMS message is transmitted over a phone network (block 508). For example, the SMS message may be transmitted automatically and without intervention by the communication device 120 over the base station's 128 phone network such as a cellular network or other network usable for communication between communication devices 120.

A notification is displayed that notifies a user that the SMS message was transmitted (block 510). For example, the SMS message may be listed in a history of sent messages on the communication device 120. In addition, a confirmation popup may be displayed on a display screen of the communication device 120 to confirm to the user that the SMS message was transmitted successfully, or not.

Figure 6:
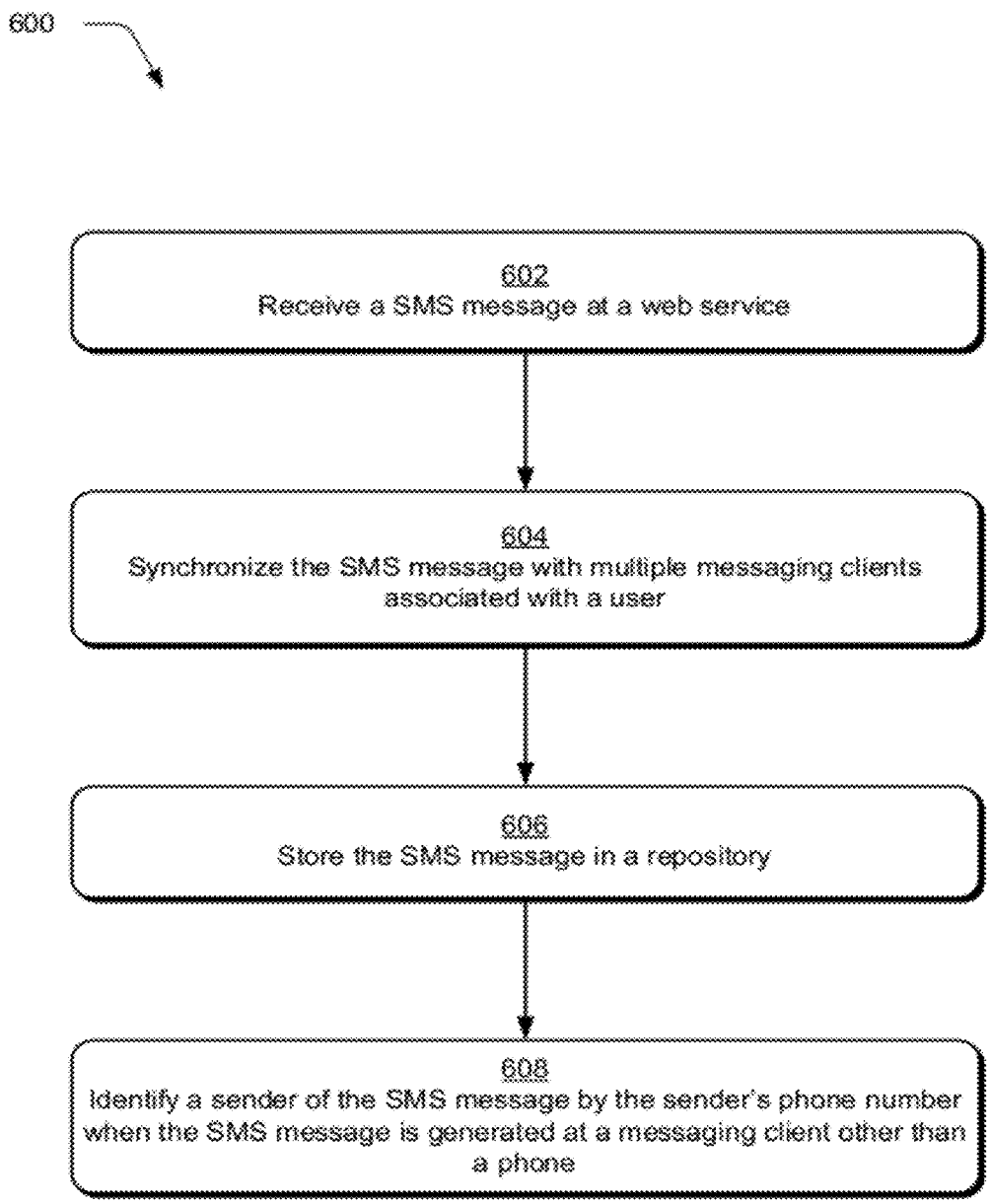
FIG. 6 is a flow diagram depicting a procedure in an example implementation of unified messaging techniques for incoming messages in accordance with one or more embodiments.

FIG. 6 is a flow diagram that depicts a procedure 600 in an example implementation of unified messaging techniques in accordance with one or more embodiments. In at least some embodiments, procedure 600 may be performed by a suitably configured computing device either automatically or in response to a user command.

A SMS message is received at a web service (block 602). For example, the SMS message may be an incoming SMS message that was sent to a communication device 120 associated with a recipient user. The communication device 120 may be configured to, automatically and without intervention, forward the SMS message to the web service 302, as shown in FIG. 3.

The SMS message may be synchronized with multiple messaging clients each associated with the recipient user (block 604). For example, the web service 302 may synchronize the SMS message across an email client 304, a web client 306, an IM client 308, and/or any other messaging client associated with the recipient user. This may allow the recipient user to access the SMS message from any one or more of the multiple messaging clients, even though the SMS message was originally sent to the recipient user's communication device 120. For instance, the user may use the IM client 308 to access a SMS message originally sent to his mobile phone.

The SMS message is stored in a repository (block 606). For example, the web service 302 may store the SMS message in a message database for later access by the recipient user. The message database may be accessed by one or more of the multiple messaging clients to allow the user access to previously received and/or sent messages.

A sender of the SMS message is identified by the sender's phone number when the SMS message is generated at a messaging client other than a phone (block 608). For example, although the SMS message may have been generated at an IM client, which may not be associated with a sender's phone number, the SMS message may have been routed through a sender's mobile phone and had the sender's phone number attached to the SMS message.

The methods and procedures described herein may be performed via a plurality of devices including, for example, a plurality of communication devices 120 each associated with the same user. Alternatively or additionally, the methods and procedures described herein may be performed without the aid of a communication device 120 such as the user's mobile phone.

Example Device

Figure 7:
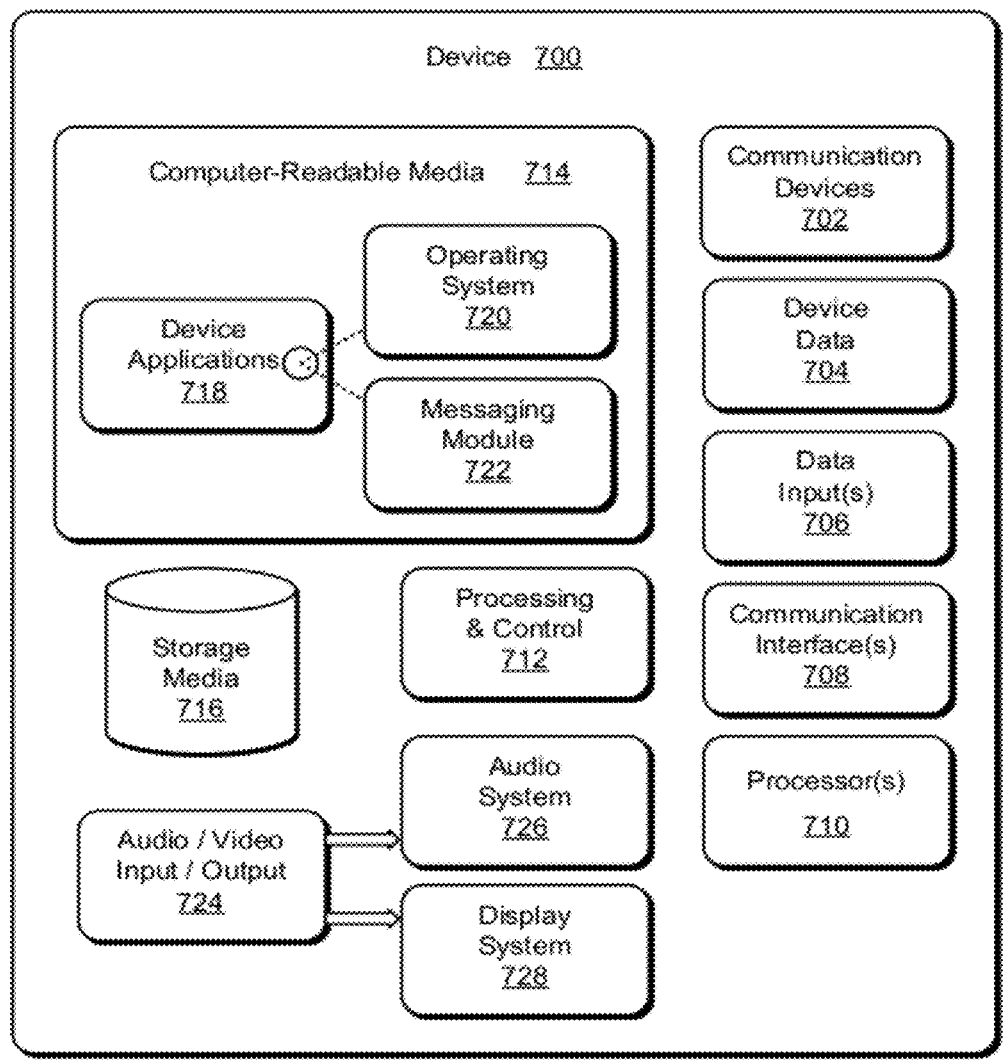
FIG. 7 illustrates various components of an example device that can be implemented as any type of portable and/or computer device as described with reference to FIGS. 1-6 to implement embodiments of the unified messaging techniques described herein.

FIG. 7 illustrates various components of an example device 700 that can be implemented as any type of portable and/or computer device as described with reference to FIGS. 1-3 to implement embodiments of the unified messaging techniques described herein. Device 700 includes communication devices 702 that enable wired and/or wireless communication of device data 704 (e.g., received data, data that is being received, data scheduled for broadcast, data packets of the data, etc.). The device data 704 or other device content can include configuration settings of the device, media content stored on the device, and/or information associated with a user of the device. Media content stored on device 700 can include any type of audio, video, and/or image data. Device 700 includes one or more data inputs 706 via which any type of data, media content, and/or inputs can be received, such as user-selectable inputs, messages, music, television media content, recorded video content, and any other type of audio, video, and/or image data received from any content and/or data source.

Device 700 also includes communication interfaces 708 that can be implemented as any one or more of a serial and/or parallel interface, a wireless interface, any type of network interface, a modem, and as any other type of communication interface. The communication interfaces 708 provide a connection and/or communication links between device 700 and a communication network by which other electronic, computing, and communication devices communicate data with device 700.

Device 700 includes one or more processors 710 (e.g., any of microprocessors, controllers, and the like) which process various computer-executable instructions to control the operation of device 700 and to implement embodiments described herein. Alternatively or in addition, device 700 can be implemented with any one or combination of hardware, firmware, or fixed logic circuitry that is implemented in connection with processing and control circuits which are generally identified at 712. Although not shown, device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 700 also includes computer-readable media 714, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 700 can also include a mass storage media device 716.

Computer-readable media 714 provides data storage mechanisms to store the device data 704, as well as various device applications 718 and any other types of information and/or data related to operational aspects of device 700. For example, an operating system 720 can be maintained as a computer application with the computer-readable media 714 and executed on processors 710. The device applications 718 can include a device manager (e.g., a control application, software application, signal processing and control module, code that is native to a particular device, a hardware abstraction layer for a particular device, etc.). The device applications 718 also include any system components or modules to implement embodiments of the unified messaging techniques described herein. In this example, the device applications 718 include a messaging module 722 that is shown as a software module and/or a computer application. The messaging module 722 is representative of software that is used to transmit/receive electronic messages. Alternatively or in addition, the messaging module 722 can be implemented as hardware, software, firmware, or any combination thereof.

Device 700 also includes an audio and/or video input-output system 724 that provides audio data to an audio system 726 and/or provides video data to a display system 728. The audio system 726 and/or the display system 728 can include any devices that process, display, and/or otherwise render audio, video, and image data. Video signals and audio signals can be communicated from device 700 to an audio device and/or to a display device via an RF (radio frequency) link, S-video link, composite video link, component video link, DVI (digital video interface), analog audio connection, or other similar communication link. In an embodiment, the audio system 726 and/or the display system 728 are implemented as external components to device 700. Alternatively, the audio system 726 and/or the display system 728 are implemented as integrated components of example device 700.

Communication Techniques

The following provides further examples of the communications techniques that may be employed to deliver a message to a communication device as well as transmit the message by the communication device.

Instant Messaging

Instant messaging is a popular text-based communication tool that enables two or more users to exchange messages via a network during an instant messaging session. When two users are online at the same time, for instance, instant messages may be exchanged in real time between the two users. Thus, the instant messages may be utilized to support a text conversation between the two users in a manner that mimics how the two users would participate in a typical spoken conversation.

Instant messaging is typically based on clients that facilitate connections between specified known users. Often, these known users can be associated with a "buddy list" or "contact list." Although instant messaging is text-based, instant messaging may include additional features such as audio and/or video. For example, during an instant messaging session, users can see each other by using webcams or other video cameras, and/or hear each other using microphones and speakers.

In an implementation, instant messaging (IM) modules communicate with each other through use of one or more of a plurality of service providers. A service provider, for instance, may include an IM manager module, which is executable to route instant messages between the IM modules. For example, a client may cause the IM module to form an instant message for communication to a recipient. The IM module is executed to communicate the instant message to the service provider, which then executes the IM manager module to route the instant message to the recipient over the network. The recipient receives the instant message and executes the IM module to display the instant message.

Clients can also be communicatively coupled directly, one to another (e.g., via a peer-to-peer network). If so, the instant messages are communicated without utilizing the service provider.

SMS/MMS

Short Messaging Service (SMS) is communication tool that allows an exchange of short text messages between a fixed line or mobile phone device and fixed or portable devices over a network. Unlike instant messaging, SMS messages can be transmitted without both the sender and receiver being simultaneously online. SMS messages may be sent to a Short Message Service Center (SMSC), which may provide a store and forward mechanism. The SMSC may then attempt to send the SMS messages to intended recipients. If a recipient cannot be reached, the SMSC may queue the SMS message and retry at a later time. Some SMSCs, however, may provide a forward and forget option where transmission is attempted only once. Both senders and recipients of SMS messages may be identified by a phone number associated with the device being used to send or receive the SMS message.

In addition to text, SMS techniques have been expanded to include Multimedia Messaging Service (MMS) which allows the exchange of multimedia content along with the short text messages. Multimedia content may include digital photographs, videos, and the like. Similar to SMS messages, MMS messages may identify senders and recipients by their respective phone numbers.

Although MMS messages are similar to SMS messages, MMS messages are delivered in an entirely different way. For example, the multimedia content in the MMS message is first encoded in a manner similar to a Multipurpose Internet Mail Extension (MIME) email. The encoded MMS message is then forwarded to a Multimedia Messaging Service Carrier (MMSC), which is a carrier's MMS store and forward server. If the intended recipient is associated with a different carrier, the MMSC may forward the encoded message to the recipient's carrier using the Internet.

Once the MMSC has received the message, it may determine whether the recipient's device is configured to receive an MMS message. If the recipient's device is MMS capable, then the content is extracted and sent to a temporary storage server with a Hypertext Transfer Protocol (HTTP) front-end. An SMS control message containing a Uniform Resource Locator (URL) of the MMS content may then be sent to the recipient's device to trigger the recipient device's Wireless Access Protocol (WAP) browser to open and receive the MMS content from the URL. If, however, the recipient device does not support MMS messages, the MMSC may attempt to modify the MMS content into a format suitable for the recipient device before sending the MMS content to the recipient device.

Electronic Mail

Electronic mail, commonly referred to as email or e-mail, is a communication tool for exchanging digital messages from an author to one or more recipients over a network. A user can send an email message through his or her email program, which sends the email message to a mail server. The mail server may then forward the email message to another mail server or to a message store on the same mail server to be forwarded later. Unlike instant messages or SMS/MMS messages, email messages may identify senders and recipients by addresses including user names and domain names.

Email messages include an envelope, a header, and a body. The header may include fields that have names and values. Some example fields include From, To, CC, Subject, Date, and other information about the email message. The body may include basic content of the email message, as unstructured text, and may also include a signature block. The envelope is used to store communication parameters for delivery of the email message.

Email is one of the protocols included with the Transport Control Protocol/Internet Protocol (TCP/IP) suite of protocols. An example popular protocol for sending email is Simple Mail Transfer Protocol (SMTP), whereas example popular protocols for receiving emails include Post Office Protocol 3 (POP3) and/or Internet Message Access Protocol (IMAP). TCP/IP can be used as a communication language or protocol of the Internet, an intranet, or extranet. When an email message is sent over a network, the TCP manages assembly of the message or file into smaller packets, also referred to as "packetizing" the message. These packets are transmitted over the network, such as the Internet, and received by a TCP layer that reassembles the packets into the original message. The IP layer handles the address portion of each packet to ensure that each packet reaches the correct destination.

Web Service

Electronic messages may also be sent and received via a web service. A web service may include a software system designed to support interoperable machine-to-machine interaction over a network. Implementations of web services include web-based email services and/or web-based IM services. Web based services may include Extensible Markup Language (XML) messages that follow a Simple Object Access Protocol (SOAP) standard. Other web services may include Web Application Programming Interfaces (Web API), which may include a set of HTTP request messages along with a definition of the structure of response messages.

Web services may be used in a number of ways. Some example uses include Remote Procedure Calls (RPC), Service-Oriented Architecture (SOA), and Representational State Transfer (REST).

Interoperability of Electronic Communication

In some implementations one communication tool may be used within another. For example, email messages may be sent and/or received from within a web service. In addition, SMS messages may be sent using an email application and/or an IM application. When one communication tool is used within another tool, however, the one communication tool may have limited functionality which may affect the message being sent or received.

For instance, a SMS message may be sent from within an email application. However, email identifies the sender by an email address whereas SMS identifies senders and receivers by phone number. In traditional techniques, a random phone number may be attached to the SMS message before the recipient receives the SMS message. This random phone number may create a disconnect between the sender and recipient at least because the recipient may not know or recognize the sender of the SMS message, causing user confusion and frustration. Having considered traditional techniques used for electronic communication, the following describes techniques for a unified messaging service.

CONCLUSION

Although embodiments of unified messaging techniques have been described in language specific to structural features and/or methodological acts, it is to be understood that the subject matter defined in the appended claims is not necessarily limited to the specific features or acts described. Rather, the specific features and acts are disclosed as example forms of implementing the unified messaging techniques.

What is claimed is:

1. A method implemented by one or more computing devices of a web service, the method comprising:
 receiving a message at the web service from a messaging client;
 identifying a client communication device that includes telephone functionality and is associated with a same user that sent the message via the messaging client, the client communication device being further configured to format the message as a short message service (SMS) message and assign a phone number associated with the client communication device to the SMS message; and
 sending the message to the client communication device for automatic transmission of the SMS message via the client communication device and over a phone network such that the user that sent the message via the messaging client is identifiable by the phone number associated with the client communication device.

2. The method of claim 1, wherein the messaging client comprises a messaging client other than a phone and the message is not sent to the client communication device by the web service as an SMS message.

3. The method of claim 1, wherein the client communication device is configured to transmit the SMS message automatically and without intervention.

4. The method of claim 1, further comprising causing the client communication device to, automatically and without intervention, format the message as the SMS message and transmit the SMS message.

5. The method of claim 1, wherein the messaging client comprises at least one of an instant messaging client, a web client, or an email client.

6. The method of claim 1, wherein the SMS message is configured to retain an identity of a user that originated the message.

7. The method of claim 1, wherein the phone number of the client communication device is usable to identify the user that originated the message at the messaging client.

8. The method of claim 7, wherein the client communication device and a client device executing the messaging client are both associated with a same user.

9. A method, comprising:
 receiving a first message over a network at a client communication device associated with a user, the first message being received from a first messaging client associated with the user that created the first message;
 receiving a second message over the network at the client communication device, the second message being received from a second messaging client that is associated with the user and which comprises a device that is different than a device of the first messaging client, the second message created by the user at the second messaging client;
 configuring, at the client communication device, the first message as a first short messaging service (SMS) message and the second message as a second SMS message;
 assigning, at the client communication device, a same phone number associated with the client communication device to the first SMS message and to the second SMS message to identify the user that sent the first and second messages via the first and second messaging clients by the phone number associated with the client communication device; and
 transmitting said first and second SMS messages over a phone network for receipt by a client communication device associated with a different user.

10. The method of claim 9, wherein the acts of configuring, assigning, and transmitting are performed automatically and without intervention by the client communication device and the received message is not configured as an SMS message.

11. The method of claim 9, wherein the client communication device includes telephone functionality.

12. The method of claim 9, wherein at least one of the first messaging client or the second messaging client comprises at least one of an instant messaging client, a web client, or an email client.

13. The method of claim 12, wherein at least one of the first message or the second message was composed via SMS functionality at the first messaging client or the second messaging client, respectively.

14. The method of claim 9, wherein at least one of the first message or the second message is received from a web service.

15. The method of claim 9, further comprising generating a confirmation that at least one of the first SMS message or the second SMS message was transmitted.

16. The method of claim 9, further comprising displaying on a display screen a notification that at least one of first SMS message or the second SMS message was transmitted.

17. A client communication device comprising:
 a memory configured to store instructions as a messaging module; and
 one or more processors to implement the messaging module, the messaging module being configured to:
  receive multiple messages over a network from multiple different messaging clients each associated with a same user that is associated with the client communication device, each message identifying the same user by using an identifier associated with a respective messaging client; and subsequent to the multiple messages being received from the multiple different messaging clients, automatically and without user intervention:

format the multiple messages as short messaging service (SMS) messages;

attach a phone number associated with the client communication device to each of the SMS messages to identify the user that sent the multiple messages from the multiple different messaging clients by the phone number associated with the client communication device; and transmit the SMS messages over a phone network for receipt by another client communication device associated with a different user.

18. A client communication device as recited in claim 17, wherein at least one of the multiple messaging clients includes at least one of an instant messaging client, a web client, or an email client.

19. A client communication device as recited in claim 17, wherein the client communication device is further configured to generate a confirmation that at least one of the SMS messages was transmitted.

20. A client communication device as recited in claim 17, wherein at least one of the multiple messages is received from a web service.

* * * * *